(12) United States Patent
Storzum et al.

(10) Patent No.: US 8,972,276 B2
(45) Date of Patent: Mar. 3, 2015

(54) EXECUTED WORKLOAD

(75) Inventors: Andreas Storzum, Sandhausen (DE); Alexander Mandel, Bruchsal (DE); Jan Kappallo, Reilingen (DE); Juergen Mueller, Kandel (DE); Wassili Sabelfeld, Keonigs Wusterhausen (DE)

(73) Assignee: SAP AG, Walldorf (DE)

( * ) Notice: Subject to any disclaimer, the term of this patent is extended or adjusted under 35 U.S.C. 154(b) by 1655 days.

(21) Appl. No.: 11/847,160

(22) Filed: Aug. 29, 2007

(65) Prior Publication Data
US 2009/0063238 A1    Mar. 5, 2009

(51) Int. Cl.
*G06Q 10/06*    (2012.01)
*G06Q 10/10*    (2012.01)

(52) U.S. Cl.
CPC .......... *G06Q 10/10* (2013.01); *G06Q 10/06398* (2013.01)
USPC ....... 705/7.42; 705/7.12; 705/7.13; 705/7.15; 705/7.17

(58) Field of Classification Search
USPC ............... 705/7.42, 8, 9, 11, 7.12, 7.13, 7.15, 705/7.17
See application file for complete search history.

(56) References Cited

U.S. PATENT DOCUMENTS

| 2001/0056367 | A1* | 12/2001 | Herbert et al. | 705/11 |
| 2004/0162811 | A1* | 8/2004 | Wetzer et al. | 707/2 |
| 2004/0199437 | A1 | 10/2004 | Lessmoellmann et al. | |
| 2006/0026053 | A1* | 2/2006 | Dezonno et al. | 705/9 |
| 2006/0168571 | A1* | 7/2006 | Ghiasi et al. | 717/127 |
| 2007/0118416 | A1* | 5/2007 | Hendren | 705/8 |
| 2007/0156255 | A1 | 7/2007 | Herrmann et al. | |
| 2008/0059340 | A1* | 3/2008 | McCaherty et al. | 705/28 |

OTHER PUBLICATIONS

"Warehouse." dictionary.com. 2014. http://dictionary.reference.com/browse/warehouse?s=t . Web. Apr. 4, 2014.*

* cited by examiner

*Primary Examiner* — Seye Iwarere
*Assistant Examiner* — Reva R Danzig
(74) *Attorney, Agent, or Firm* — Blakely Sokoloff Taylor & Zafman LLP (57) ABSTRACT

Methods and apparatuses enable generation of an executed workload electronic record. The executed workload record indicates data related to one or more performance metrics by which performance of a work task is evaluated. One such performance metric is an expected time for completion of the task. Performance of the task can be monitored to determine an actual completion time for the task to compare against an expected completion time. The executed workload record can be used for evaluation of workers. Executed workload records provide centralized, aggregatable information for evaluation purposes.

18 Claims, 7 Drawing Sheets

| PLANNED WORKLOAD 302 ||||| 
|---|---|---|---|---|
| WHAT 310 | WHERE 320 | WK TYPE 330 | SOURCE 340 | P-TIME 350 |
| TASK ID | AREA | PROCESS | WH/O | TIME EST |
| TASK ID | AREA | PROCESS | WH/O | TIME EST |
| TASK ID | AREA | PROCESS | WH/O | TIME EST |
| ... | ... | ... | ... | ... |

| EXECUTED WORKLOAD 304 |||||||
|---|---|---|---|---|---|---|
| WHAT 310 | WHERE 320 | WK TYPE 330 | SOURCE 340 | P-TIME 350 | WHO 360 | E-TIME 370 |
| TASK ID | AREA | PROCESS | WH ORDER | TIME EST | EMP ID | TOT TIME |
| TASK ID | AREA | PROCESS | WH ORDER | TIME EST | EMP ID | TOT TIME |
| TASK ID | AREA | PROCESS | WH ORDER | TIME EST | EMP ID | TOT TIME |
| TASK ID | AREA | PROCESS | WH ORDER | TIME EST | EMP ID | TOT TIME |
| ... | ... | ... | ... | ... | ... | ... |

| PLANNED WORKLOAD 302 | | | | |
|---|---|---|---|---|
| WHAT 310 | WHERE 320 | WK TYPE 330 | SOURCE 340 | P-TIME 350 |
| TASK ID | AREA | PROCESS | WH/O | TIME EST |
| TASK ID | AREA | PROCESS | WH/O | TIME EST |
| TASK ID | AREA | PROCESS | WH/O | TIME EST |
| ... | ... | ... | ... | ... |

| EXECUTED WORKLOAD 304 | | | | | | |
|---|---|---|---|---|---|---|
| WHAT 310 | WHERE 320 | WK TYPE 330 | SOURCE 340 | P-TIME 350 | WHO 360 | E-TIME 370 |
| TASK ID | AREA | PROCESS | WH ORDER | TIME EST | EMP ID | TOT TIME |
| TASK ID | AREA | PROCESS | WH ORDER | TIME EST | EMP ID | TOT TIME |
| TASK ID | AREA | PROCESS | WH ORDER | TIME EST | EMP ID | TOT TIME |
| TASK ID | AREA | PROCESS | WH ORDER | TIME EST | EMP ID | TOT TIME |
| ... | ... | ... | ... | ... | ... | ... |

FIG. 3

| PLANNED WORKLOAD 410 | | | | | | |
|---|---|---|---|---|---|---|
| ID | PROCS | AREA | HU | WH/O | PDURA | WT |
| 4710 | PICK | PI01 | | 1001 | 30 MIN | |
| 4711 | PACK | PA01 | | | 20 MIN | 12345 |
| 4711 | STAG | ST01 | | | 10 MIN | 12345 |
| 4711 | LOAD | LO01 | | | 10 MIN | 12345 |
| 4712 | PACK | PA01 | | | 30 MIN | 12346 |
| 4712 | STAG | ST01 | | | 10 MIN | 12346 |
| 4712 | LOAD | LO01 | | | 10 MIN | 12346 |
| 4713 | PACK | PA01 | | | 10 MIN | 12347 |
| 4713 | STAG | ST01 | | | 10 MIN | 12347 |
| 4713 | LOAD | LO01 | | | 10 MIN | 12347 |

FIG. 4A

| PLANNED WORKLOAD 412 | | | | | | |
|---|---|---|---|---|---|---|
| ID | PROCS | AREA | HU | WH/O | PDURA | WT |
| 4714 | PACK | PA01 | 2001 | | 30 MIN | |
| 4714 | STAG | ST01 | 2001 | | 10 MIN | |
| 4714 | LOAD | LO01 | 2001 | | 10 MIN | |
| 4715 | PACK | PA01 | 2002 | | 30 MIN | |
| 4715 | STAG | ST01 | 2002 | | 10 MIN | |
| 4715 | LOAD | LO01 | 2002 | | 10 MIN | |

| EXECUTED WORKLOAD 420 | | | | | | |
|---|---|---|---|---|---|---|
| GUID | PROCS | AREA | TYPE | DOC | PDURA | EDURA |
| 1 | PICK | PI01 | WH/O | 1001 | 30 MIN | 32 MIN |

FIG. 4B

| PLANNED WORKLOAD 414 | | | | | | |
|---|---|---|---|---|---|---|
| ID | PROCS | AREA | HU | WH/O | PDURA | WT |
| 4716 | STAG | ST01 | 2003 | | 30 MIN | |
| 4716 | LOAD | LO01 | 2003 | | 10 MIN | |

| EXECUTED WORKLOAD 422 | | | | | | |
|---|---|---|---|---|---|---|
| GUID | PROCS | AREA | TYPE | DOC | PDURA | EDURA |
| 1 | PICK | PI01 | WH/O | 1001 | 30 MIN | 32 MIN |
| 2 | PACK | PA01 | WH/O | 1004 | 60 MIN | 45 MIN |

FIG. 4C

| PLANNED WORKLOAD 416 | | | | | | |
|---|---|---|---|---|---|---|
| ID | PROCS | AREA | HU | WH/O | PDURA | WT |
| 4717 | STAG | ST01 | | 1005 | 10 MIN | |
| 4717 | LOAD | LO01 | 2003 | | 10 MIN | |

| EXECUTED WORKLOAD 422 | | | | | | |
|---|---|---|---|---|---|---|
| GUID | PROCS | AREA | TYPE | DOC | PDURA | EDURA |
| 1 | PICK | PI01 | WH/O | 1001 | 30 MIN | 32 MIN |
| 2 | PACK | PA01 | WH/O | 1004 | 60 MIN | 45 MIN |

FIG. 4D

| PLANNED WORKLOAD 418 | | | | | | |
|---|---|---|---|---|---|---|
| ID | PROCS | AREA | HU | WH/O | PDURA | WT |
| 4718 | LOAD | LO01 | | 1006 | 10 MIN | |

| EXECUTED WORKLOAD 424 | | | | | | |
|---|---|---|---|---|---|---|
| GUID | PROCS | AREA | TYPE | DOC | PDURA | EDURA |
| 1 | PICK | PI01 | WH/O | 1001 | 30 MIN | 32 MIN |
| 2 | PACK | PA01 | WH/O | 1004 | 60 MIN | 45 MIN |
| 3 | STAG | ST01 | WH/O | 1005 | 10 MIN | 12 MIN |

FIG. 4E

| EXECUTED WORKLOAD 426 | | | | | | |
|---|---|---|---|---|---|---|
| GUID | PROCS | AREA | TYPE | DOC | PDURA | EDURA |
| 1 | PICK | PI01 | WH/O | 1001 | 30 MIN | 32 MIN |
| 2 | PACK | PA01 | WH/O | 1004 | 60 MIN | 45 MIN |
| 3 | STAG | ST01 | WH/O | 1005 | 10 MIN | 12 MIN |
| 4 | LOAD | LO01 | WH/O | 1006 | 10 MIN | 15 MIN |

EXECUTED WORKLOAD

FIELD

Embodiments of the invention relate to electronic records, and more particularly to performance records having evaluation metrics to indicate work performance.

BACKGROUND

Companies hire employees to perform the work of the company. The company has an interest in verifying that the employees are performing their work as expected. The company and the employees have an interest in evaluating the employees to properly compensate them for the work performed (e.g., giving bonuses to productive employees), or to determine areas where an employee might be more productive (e.g., perhaps the employee is in need of training).

Current work management systems are inadequate at providing the information a manager wants to be able to fairly evaluate and compensate an employee. With traditional management systems, information, if available at all, is frequently spread across different systems and/or different company records. Attempting to synthesize the information may be difficult, and there may be information that is unavailable for consideration.

One example situation of the above occurs in warehouse management. Warehouse management systems exist, but suffer the problems discussed above. Thus, for a warehouse manager to track and monitor what warehouse workers were doing during certain periods of time, the manager typically has to access many different types of documents or electronic records, which may include warehouse orders, warehouse tasks, value added service orders, quality inspection documents, inventory documents, etc. Traditionally, such documents or records are not all compatible; yet, only compatible records can traditionally be merged. The warehouse manager may not be able, due to time constraints and/or inability to access information, to fairly compare planned work to actual performance of tasks.

Another problem with traditional systems is that companies generally have what could be considered tasks related to the core business of the company, and tasks not related to the core business. Prior systems make no distinction in types of work tasks in such a manner. Traditional warehouse management systems do not even have a provision for tracking non-core tasks. Thus, traditional systems lack the ability to provide the information a manager needs to provide a fair evaluation of work performed in the company. What information might be available is distributed and not easily accessible, resulting in ineffective management, and inefficient use of time.

SUMMARY

Methods and apparatuses provide for an executed workload that indicates one or more performance metrics related to the performance of a work task. An example of a performance metric is a time for completion of the task. In one embodiment, a planning document is received that indicates the task and one or more performance metrics. Based on a time of completion of the task, an actual time for completion of the task can be determined. An executed workload is generated that identifies the task and the performer and indicates a value for at least one task performance metric. The executed workload is stored to create a record of the task performance.

The task to be completed can be a task related to a core business, or an indirect labor task (e.g., housekeeping details). Thus, work records can be created for both core business labor as well as non-core business labor. In one embodiment, the executed workload links to a source order or document that initiates the task. Such a source could include further details regarding resources to use for the task, or other circumstantial details. The circumstance data can be applicable to make sure evaluation of services is made in a consistent and fair manner.

In one embodiment, a time of completion is generated in reference to an expected time for completion that is a base time adjusted for specific details of the performance (conditions, resources to be used, etc.). In one embodiment, performance data is aggregated. Because the executed workload provides performance data, the data for multiple performers across multiple different types of tasks can be obtained from a consistent form. The data allows for the fair assessment of work performed, accounting for specific details of the conditions associated with performance, which are stored or referenced in the executed workload.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, an executed workload includes information related to the performance of one or more tasks. The executed workload may be referred to as an executed workload document or an electronic record. As used herein, a "document" may refer to traditional concepts of a document, which generally is understood to have information in a file, or something that can be viewed on a screen in a "layout" form, and can be printed onto a sheet of paper. However, a document can also refer more generally to information having a format, and sharing some relationship. Thus, information in a traditional "paper" style document is part of the same layout. Information could also be related as being of the same type, related to the same task, etc. A document as described herein may include one or more data objects that are part of the document. The executed workload may be referred to as an executed workload electronic record. An electronic record may refer to a single set of data (e.g., multiple fields), or multiple sets of data having a common layout (e.g., a table). Thus, a record can refer to a single instance of data for a single task, or multiple instances of data related to multiple tasks. Note that similar to a document, an electronic record as described herein may also include one or more objects. A planned workload can also be a document or a record as described above, but containing performance expectations rather than actual performance data.

With the executed workload, all information about a work task may be available from a single source, such as when, what, where, how long, how much work was planned, when the work started, when it ended, and who executed the task. Such aggregated information provides a manager the ability to access and process the data in an efficient manner. All data necessary for evaluation of performance can be provided in the single executed workload record. With the data in a single accessible location, and in a consistent formatting, a manager could more easily provide the data to, for example, a connected HR (human resources) system to determine a bonus for a worker, or a group. Standard warehouse management systems do not offer a central document that holds all information necessary for evaluation of performance, and information for making evaluations fair (normalizing the data for the conditions of the performance). For monitoring and analysis purposes in typical management systems, only documents of the same kind can easily be compared. Having a single format for the data allows comparison and merger.

With the executed workload, the comparison of planned and actual time durations for different workers, or different groups can be included within a single data source (the executed workload) to allow fair conclusions about individual or group performance. In one embodiment, a warehouse manager gathers information at regular intervals to understand the duration, weight, and volume of product in reference to a warehouse number, area, and month in which a warehouse has produced workload.

In one embodiment, indirect labor is also monitored. Traditional planned workload indicates a task and provides expectations for performance of the task (e.g., how much time it will take to perform). Traditional planned workloads are limited to direct-labor tasks or core business tasks, or tasks that directly contribute to producing and/or shipping a product (e.g., manufacturing, testing/inspection, moving product within a warehouse, value added services, inventory count, etc.). As used herein, indirect labor tasks or non-core business tasks can refer to anything that is not a direct-labor task. Examples may include small maintenance or housekeeping tasks, accounting for unforeseen downtime (e.g., power outage, system failure, etc., which may unexpectedly prevent work from being done), etc. In one embodiment, the system generates an executed workload for every indirect labor task. The addition of the executed workload for indirect labor provides a more complete picture of what a warehouse worker does during a certain period of time, and provides the information in a location where other performance information is gathered and analyzed.

With the executed workload, it is possible for a manager to make decisions based on monitoring only one type of record, the executed workload. Apart from the tasks related to the core business of the warehouse, such as those provided in warehouse orders or warehouse tasks, realistic performance expectations can be considered based on the indirect labor required of workers. In one embodiment, the system allows a manager to create a single performance document for a selected period of time (a time which can be designated by the manager, or can be chosen from among pre-defined options such as month, week, or quarter). The performance document includes planned and actual time compared with attendance, for example, as obtained from the executed workload. The planned and actual times are obtained from the executed workload, and attendance for the evaluation period can be obtained, for example, from a time management system. Following a configurable release strategy of the performance document, the system can enable the document to be transferred to HR to be included in the payroll run. The executed workload can provide a framework for information that ensures that performance data is the same regardless of the task or the performer. Thus, similar information can be maintained for each task, which allows different tasks and performers to be evaluated on the same performance metrics or performance criteria.

In one embodiment, the executed workload includes information related to engineered labor standards (ELS). Engineered labor standards provide productivity goals for workers and performance measurement standards for management. In one embodiment, performance metrics can be understood as ELS metrics, which would be structured within a company and shared between management and work force. Whether as ELS or some other performance metric, the executed workload can provide uniform standards to rate and/or evaluate performance.

In one embodiment, the executed workload is created at the completion of a task. That is, the completion of a task can act as a trigger to cause the system to generate the executed workload. Data that is generated relative to performance of the task may be stored in memory until the executed workload is generated. In one embodiment, data generated relative to performance of the task is stored as planned workload (e.g., as data in the document) until the executed workload is generated. The executed workload can be generated either when the entire task is confirmed or when parts of the task are confirmed. Alternatively, the executed workload could be generated when the task is assigned, and the information populated either as work is performed, or populated upon completion of the task.

In one embodiment, the executed workload is editable. That is, after the executed workload is generated by the system, a manager or other supervisory entity could manually edit the information in the executed workload to adjust for some condition or error in recording the information. Also, an executed workload could be manually edited, for example, to account for system downtime or some other unexpected occurrence.

Note that the discussion above, as well as the discussion below with reference to the figures makes reference to work in a warehouse. It will be understood that such references are merely exemplary, and the executed workload concepts discussed herein could be applied to a variety of work scenarios or companies.

Figure 1:
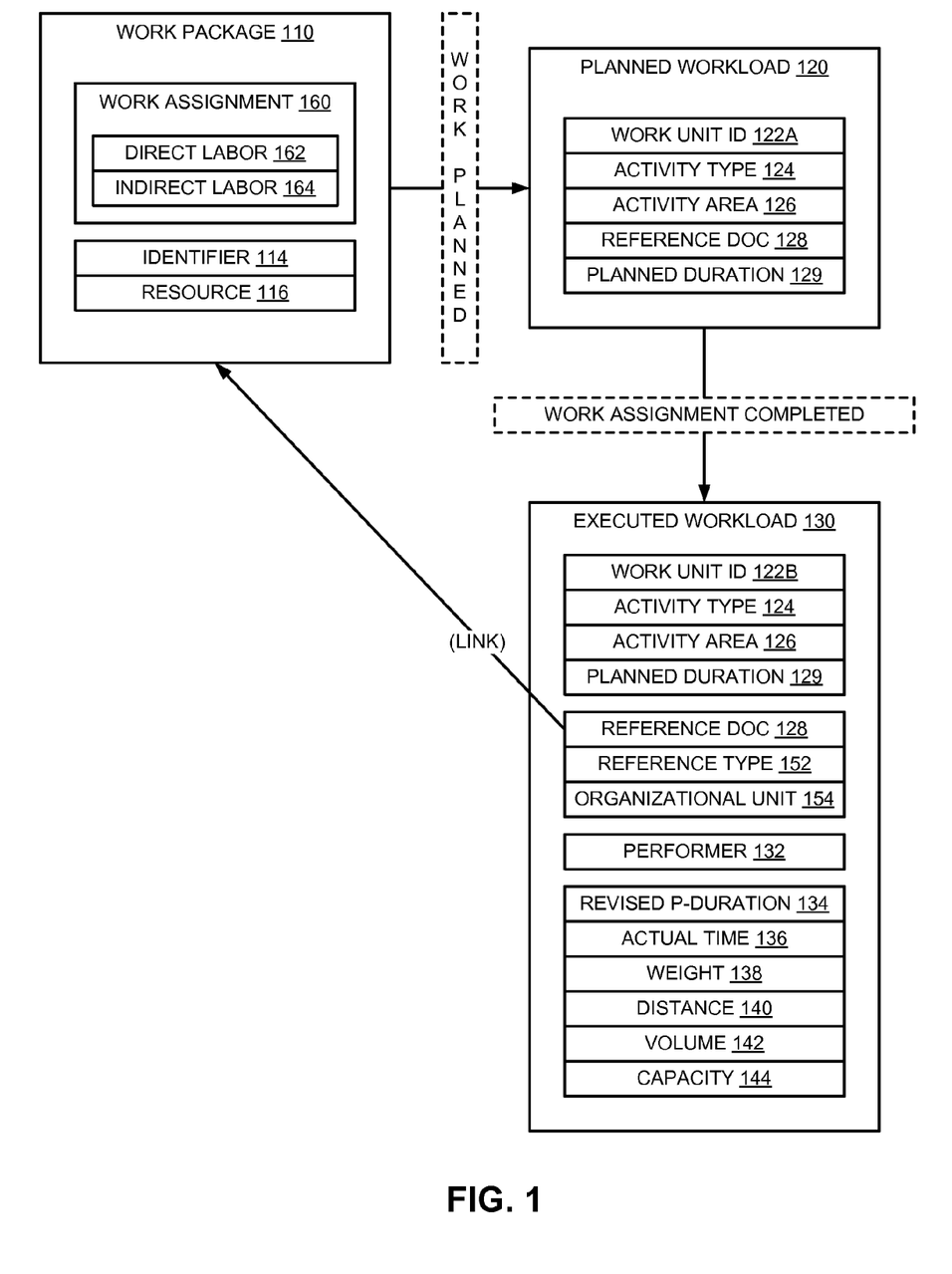
FIG. 1 is a block diagram of an embodiment of a planned workload generated from a warehouse order and an executed workload generated from the planned workload.

FIG. 1 is a block diagram of an embodiment of a planned workload generated from a warehouse order and an executed workload generated from the planned workload. Work package 110 represents any type of work order that triggers the performance of one or more tasks. Work package 110 may be applied in a warehouse, for example, to the movement of a pallet of goods, the unloading of a shipping container or truck, the packaging and shipping of a product, etc. An example of work package 110 is a warehouse order.

The work requested by work package 110 is represented by work assignment 160, which may include direct labor 162 and/or indirect labor 164. Direct labor 162, as discussed above, refers to work related to the core business of a company. Indirect labor 164 refers to any other work that cannot be accounted for as direct labor 162. Work assignment 160 has an associated identifier 114, by which the system can reference the work. In one embodiment, work package 110 includes a description of one or more resources 116, which define what resources are to be used to perform work assignment 140. Resource 116 may be any type of equipment such as tools, forklifts, testing stations, etc., as well as areas in which to perform the work or paths to use to move goods. The system can determine prior to making the assignment what resources to use. The resources used may have an effect on what performance would be expected (e.g., use of a slower forklift may increase expected performance time), as discussed more below.

Based on work package 110, the system plans how the work will be assigned and where the work will be performed. The system generates planned workload 120 from the work plans. Although the amount of information and the information fields may differ on each implementation, planned workload 120 is illustrated with representative details. A different planned workload can be generated based on different work to perform, different companies, different systems, etc.

Planned workload 120 is illustrated with work unit identifier (ID) 122A, which identifies the unit of work that is to be performed. The identifier can be unique to enable the system to reference the specific activity. Activity type 124 indicates the work type, such as picking, packing, loading, etc. Activity area 126 designates an area of a warehouse or work place where the activity identified by work unit ID 122 is to be performed (e.g., testing station 5). Reference document (doc) 128 provides a reference to work package 110 or a document associated with work package 110, such as a warehouse order. Planned duration 129 indicates how long the task is expected to take. Planned duration 129 can be based on ELS standards. In one embodiment, planned duration 129 is an adjusted planned duration, which adjusts a standard expected duration to account for specifics related to a task. That is, assume that a task nominally takes 30 minutes to complete, but is expected to take 35 minutes because of the particular forklift (resource) selected, a particular station location or travel path selected, or a particular disability of the assigned worker. Thus, fair comparison may be to the adjusted value rather than a nominal value.

The timing of the generation of executed workload 130 can be different for different implementations. In one embodiment, executed workload 130 could be generated when a work assignment is generated to a specific person. Alternatively, as illustrated, executed workload 130 could be generated when the work assignment is completed. Such a time may be indicated by a worker inputting a key combination on a computer system, pressing a button on a machine (e.g., a wireless scanner), or finishes a batch of work (e.g., the system knows that a certain number of product units have been sent to the worker and also received from the worker).

Executed workload 130 may be considered to be generated from planned workload 120, and include data of planned workload 120. Including data of planned workload 120 refers to including at least one data element indicated in planned workload 120. The data element may be read from planned workload 120, or read or received from the system. In one embodiment, executed workload 130 includes all data indicated in planned workload 120. Thus, executed workload 130 may include one or more of work unit ID 122B, activity type 124, activity area 126, reference document 128, and/or planned duration 129. Work unit ID 122B may be different for executed workload 130 than work unit ID 122A of planned workload 120. For example, work unit ID 122B may be a technical key that is unrelated to work unit ID 122A. Note that reference document 128 may be implemented as a link in executed workload 130 to not simply reference work package 110, but provide an access mechanism to it (e.g., clicking on a display of reference document 128 in executed workload 130 may open work package 110). In one embodiment, the link for work package 110 is reference document 128 together with reference type 152, which identifies a type of the reference document, and organizational unit 154, which identifies a physical or organizational unit (e.g., a supply chain unit).

Executed workload 130 indicates performer 132, which is the worker that performs the task. The worker may be identified by name, employee number, user ID, or via some other mechanism. The discussion of planned duration 129 above made reference to an adjusted or revised version of the planned duration. Such a concept is illustrated explicitly in executed workload 130 with revised P-duration (planned duration) 134. Executed workload 130 may include the original (nominal) work time estimate, as well as revised planned duration 134 to indicate more information to a manager or other data consumer. Executed workload 130 includes actual time 136, which indicates the actual time of performance for the task associated with executed workload 130 (as indicated by work unit ID 122). The actual time may be an amount of time and/or may be values indicating a start and stop time of the task, from which the duration may be derived.

Executed workload 130 can also include other details related to the work performed, such as weight 138, distance 140, volume 142, and capacity 144. Weight 138 and volume 142 refer to potentially measurable characteristics of an item that is the subject of a work task (e.g., a weight or volume of a pallet or container. Distance 140 refers to a characteristic of how the work will be performed (e.g., how far the goods must be moved). Capacity 144 refers to a dimensionless number that a customer may use to indicate the resource consumption for the execution of the different tasks. In a warehouse context, the bins may have a capacity, and the products themselves may have a certain capacity for a given quantity and unit of measure. Moving a product from one bin to another would alter the capacity usage of the bins accordingly. It will be understood that such data items are merely examples, and other types of characteristics referring to a measurable characteristics of the work item, or a characteristic of how work is to be performed, or a characteristic of a performer could be used as alternatives or in addition to what is illustrated.

In one embodiment, planned workload 120 is deleted from the system when the work is performed or in response to receiving an indication of the performance of the work, and all performance data, planned and actual, is available through executed workload 130.

Figure 2:
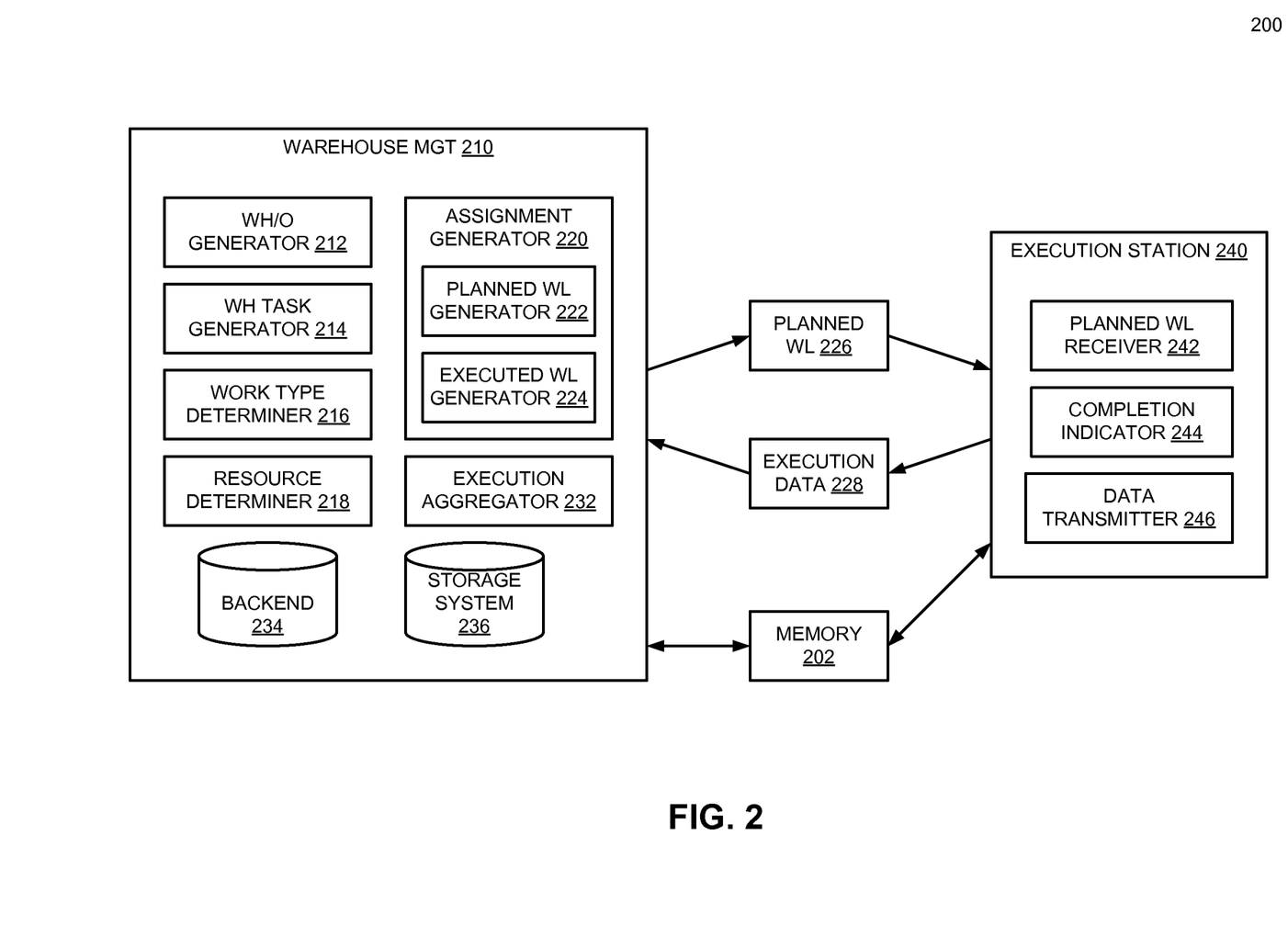
FIG. 2 is a block diagram of an embodiment of a system that generates a planned workload and an executed workload.

FIG. 2 is a block diagram of an embodiment of a system that generates a planned workload and an executed workload. System 200 provides an example of a system in which an executed workload may be generated. Warehouse management (mgt) 210 represents hardware and software components that provide a management system. For example, warehouse management 210 could be a server having management system software that monitors and manages work within a warehouse. Warehouse management 210 is illustrated with various functional blocks, which represent capabilities of warehouse management 210. The capabilities enable warehouse management 210 to operate, and may be provided via hardware or software modules or a combination.

Warehouse order (WH/O) generator 212 enables warehouse management 210 to create warehouse orders. In one embodiment, a warehouse order is created on the same system that generates planned and executed workloads. Alternatively, warehouse orders may be received at warehouse management 210, in response to which planned and executed workloads will be created. The warehouse order indicates a task to perform, and includes details about the task, including details about the work itself or how it is to be performed. Whether generated or received, warehouse orders may be stored in storage system 236.

Warehouse (WH) task generator 214 enables warehouse management 210 to generate warehouse tasks (WTs) for work such as moving goods into, out of, or within a warehouse (they may also be referred to as transfer orders). A warehouse order may include multiple WTs (e.g., a separate WT may be generated for different handling units (HUs) of the same overall task). A warehouse task may be indicated within one or both of the planned or executed workloads to associate the work with specific task identifiers. In one embodiment, the individual WTs are referenced only in the planned workload, while the executed workload contains only reference to a warehouse order rather than to the WTs. Thus, the planned workload may be finer-grained than the executed workload. The quantities of all the WTs assigned to the warehouse order may be included in the executed workload.

Work type determiner 216 enables warehouse management 210 identify and/or designate a type of work for a particular task. Work may be direct labor or indirect labor, as discussed previously. In one embodiment, a work assignment can include work of both types, which may be designated in a work assignment record for purposes of management and monitoring.

Resource determiner 218 enables warehouse management 210 to identify resources associated with performance of a task. The resources can be specified in detail to indicate what tools, vehicles, locations, etc., are to be used in the performance of a task. Such planning can "check out" certain resources for certain times to assist in scheduling. Also, such planning can indicate whether a task may be completed, or whether a necessary resource is not yet available to begin the task. Details of how a particular resource might affect performance can also be indicated to be factored into evaluation of performance.

Assignment generator 220 enables warehouse management 210 to generate work assignments and records related to planning and performance of the assignment. Thus, in one embodiment, assignment generator 220 may include planned workload (WL) generator 222 and executed workload generator 224. The details of the planned and executed workloads are discussed throughout, and will not be further detailed here. Planned workload generator 222 generates planned workload 226, which is sent to execution station 240 from where the work will be performed.

Execution station 240 represents hardware and software with which a worker may interact with the system, for example, to receive assignments and input data. Execution station 240 may be fixed, such as a workstation or computer terminal, or alternatively may be mobile, such as a handheld computing device, a multi-function scanner/input device, etc. Execution station 240 may include several modules, such as planned workload receiver 242, completion indicator 244, and data transmitter 246. Planned workload receiver 242 enables execution station 240 to receive work assignments. Execution station 240 may receive the planned workload itself, or an identifier that can be referenced. Completion indicator 244 enables a worker to indicate completion of a work task from execution station 240. Data transmitter 246 may be, for example, a wired or wireless link to warehouse management 210 that enables execution station 240 to pass performance data to warehouse management 210. The data may be raw data associated with a planned workload identifier, or the data could be loaded into fields of a form or a workload document. It is also possible to develop a system that enables execution station 240 to generate an executed workload and pass the record to warehouse management 210.

Thus, execution station 240 generates execution or performance data 228 and sends it to warehouse management 210. In one embodiment, executed workload generator 224 creates the executed workload from the received execution data 228.

System 200 may also include memory 202, which may be volatile memory such as some form of random access memory (RAM), or a flash memory. Memory 202 enables system data to be stored and used. For example, execution data 228 could be generated over the course of execution of the work task, and stored item by item as the data is created. Such data can be stored in memory for use in creating the executed workload. Memory 202 may be accessible to both execution station 240 and warehouse management 210. Memory 202 may represent separate memory devices, such as an implementation where execution station 240 includes a memory device that stores execution data, which is then sent to warehouse management 210 and stored in a memory device.

Whether created by execution station 240 or warehouse management 210, an executed workload is created that includes details of performance of the work task, as well as expectations of the performance. The executed workload is stored in storage system 236. In one embodiment, executed workload is stored in one or more backend systems, represented by backend 234. Note that backend 234 may represent the backend system itself that is hosted on the same server as the warehouse management system, or may represent the interfaces with which warehouse management 210 communicates with such a backend system. In one embodiment, details of the planned workload are obtained from backend 234. For example, resource determiner 218 may obtain resource detail information from one or more backend systems.

In one embodiment, warehouse management 210 includes execution aggregator 232, which warehouse management 210 to aggregate data from multiple executed workloads. The executed workloads from which data is aggregated may be stored in storage system 236, and/or in one or more backend systems 234. Note that the ability to aggregate performance data is possible because the data is stored with common formatting or common layout, in the same type of documents (an executed workload). Such an ability contrasts with prior known management systems where data is distributed in incompatible forms. Execution aggregator 232 enables a manager to generate performance reports or evaluation data from the executed workloads that are stored. The executed workload can have a time stamp, or have an identifier that indicates when the executed workload was created or when the work indicated by the executed workload was performed. Evaluation reports can specify an evaluation period, which is a period of time (e.g., a week, a month, a quarter, between 10 Jul. 2007 to 24 Jul. 2007, etc.). Executed workloads corresponding to the evaluation period can be selectively aggregated. Selective aggregation may involve selecting all executed workloads for a particular performer, for a particular department, for a particular group (multiple performers), etc. Performance data can also be aggregated based on work type (e.g., all work tasks for all performers over the evaluation period, all indirect labor tasks over the evaluation period, etc.). Thus, a management system with warehouse management 210 as described herein provides more complete evaluation and comparison data, which is easier to access, and more readily available than what is provided in traditional systems.

Various components referred to herein as modules, clients, engines, or agents described herein may be a means for performing the functions described. Each component described herein includes software or hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

Figure 3:
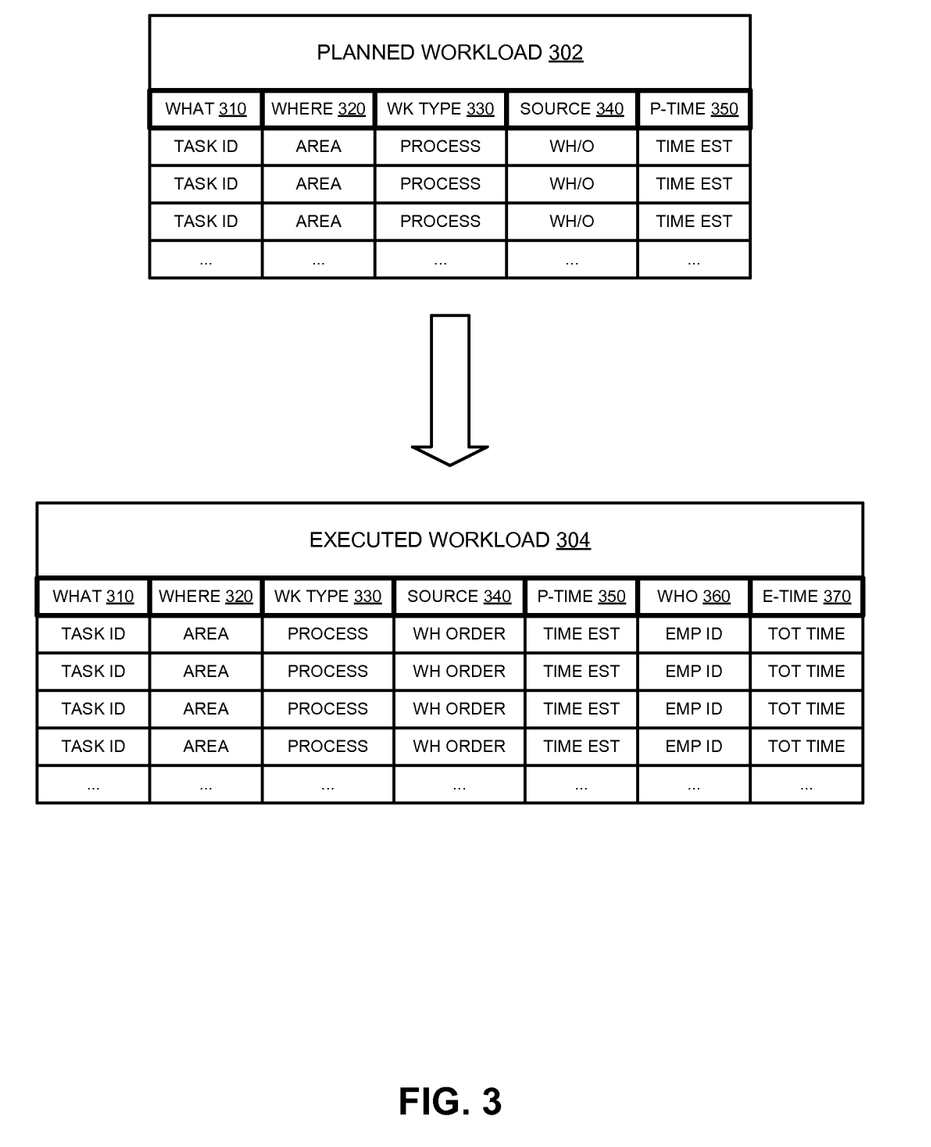
FIG. 3 is a block diagram of an embodiment of an executed workload generated from a planned workload.

FIG. 3 is a block diagram of an embodiment of an executed workload generated from a planned workload. Planned workload 302 is an example of a planned workload as described herein. Planned workload 302 illustrates types of data that may be included within a planned workload. In essence, a planned workload may include information indicating what 310 work is to be done, and where 320 it is to be performed. Details of planned workload 302 can include a list of task IDs, and work areas. Planned workload 302 may also include the planned work type 330 (for example, what process to perform), and source 340 of the work (e.g., an identification of the warehouse order (WH/O) that generated the work). Planned workload 302 also includes one or more performance metrics, such as planned time 350, which indicates a time estimate for each task.

Executed workload 304 is an example of an executed workload as described herein. As illustrated, executed workload 304 includes the data of planned workload 302, and thus includes what 310, where 320, work type 330, source 340, and planned time 350. Not every implementation of an executed workload will include all data of the planned workload. In addition to data of planned workload 302, executed workload 304 includes execution details, such as who 370 performed the work (e.g., as identified by an employee ID), and execution time 380 that indicates a total time of the work (alternatively, start and stop times could be recorded in executed workload 304). The performance data is recorded in executed workload for later access and comparison.

FIGS. 4A-4F are block diagrams of an embodiment of an example application of an executed workload. The planned workload and executed workload records as illustrated correspond to different phases of work within a warehouse. The various records have information relating one to another and/or to source documents that triggered the work for which the workload is indicative. Specifically, an outbound warehouse process is illustrated in the separate figures. Each phase will be described in turn.

Figure 4A:
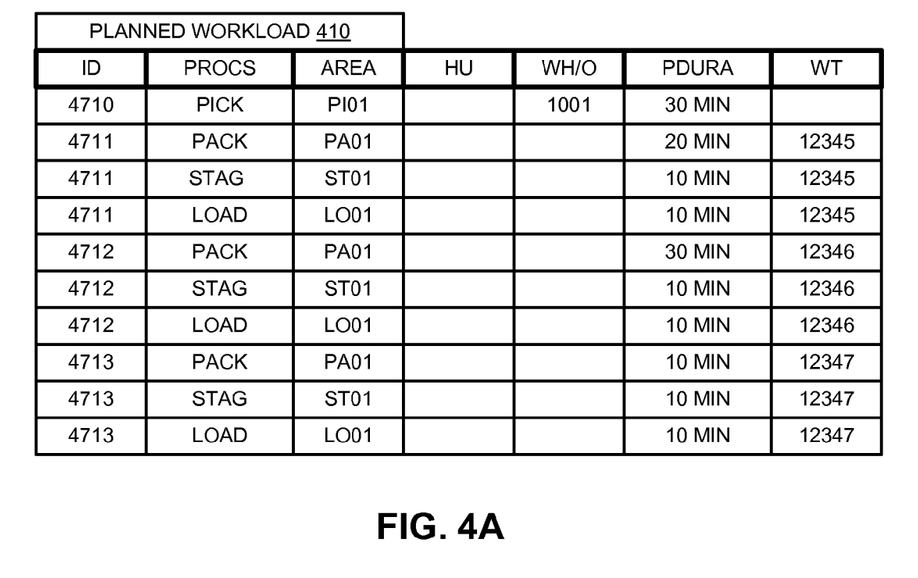
FIGS. 4A-4F are block diagrams of an embodiment of an example application of an executed workload.

FIG. 4A illustrates planned workload 410, which indicates the planned workload for three separate warehouse tasks (WT), 12345, 12346, and 12347 related to a warehouse order, WH/O 1001. Picking for the three WTs is identified by ID 4710, for Picking process of area PI01 (e.g., a Picking station). The planned duration (PDURA) is 30 minutes to pull the product for the three WTs. Each WT includes a Packing, Staging, and Loading aspect. The Packing (at station PA01), Staging (at station ST01), and Loading (at station LO01) stages are identified by identifier 4711 for WT 12345, with estimated times of 20 minutes, 10 minutes, and 10 minutes, respectively. The Packing (at station PA01), Staging (at station ST01), and Loading (at station LO01) stages are identified by identifier 4712 for WT 12346, with estimated times of 30 minutes, 10 minutes, and 10 minutes, respectively. Note that the same stations are intended to be used, which is reflective of the fact that the same performer will likely perform all the listed tasks, and will handle the WTs consecutively. The Packing (at station PA01), Staging (at station ST01), and Loading (at station LO01) stages are identified by identifier 4713 for WT 12347, with estimated times of 10 minutes, 10 minutes, and 10 minutes, respectively.

Figure 4B:
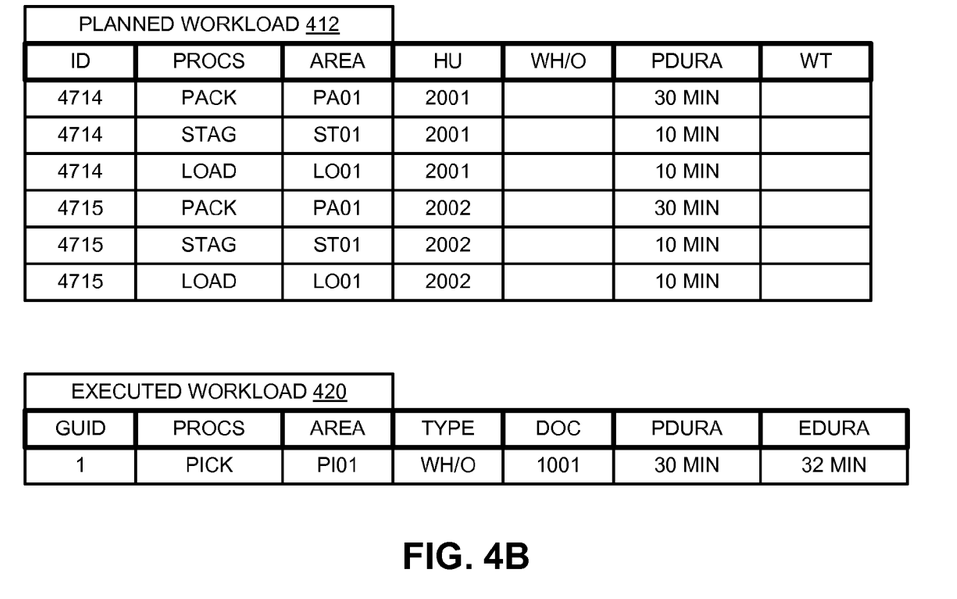

FIG. 4B illustrates planned workload 412 and executed workload 420. Assuming the tasks of FIG. 4A are completed, the performer confirms WH/O 1001, which is indicated in executed workload 420. The executed workload is identified as GUID 1, which identifies the information in the row of executed workload 420. The completed process is shown as PICK, from area PI01, of type WH/O, with the WH/O document reference ID 1001. The planned duration is also indicated with the executed duration (EDURA), which is also referred to as the actual duration or actual time of performance. The estimated duration was 30 minutes, and the executed duration was 32 minutes, which could be evaluated for compliance with acceptable standards.

When WH/O 1001 was completed, the goods would be picked from bins and sitting in a picking area. To further the process of outbound delivery, the system may also generate two Pick HUs (handling units), 2001 and 2002, into which the picked goods should be aggregated. Planned workload 412 identifies the work for HU 2001 by ID 4714, and the work for HU 2002 by ID 4715. Each HU has a Packing, Staging, and Loading phase (which will replace the equivalent phases of WH/O 1001) with respect to the goods, to be executed in areas PA01, ST01, and LO01, respectively. Planned durations are indicated for each phase of the work.

Figure 4C:
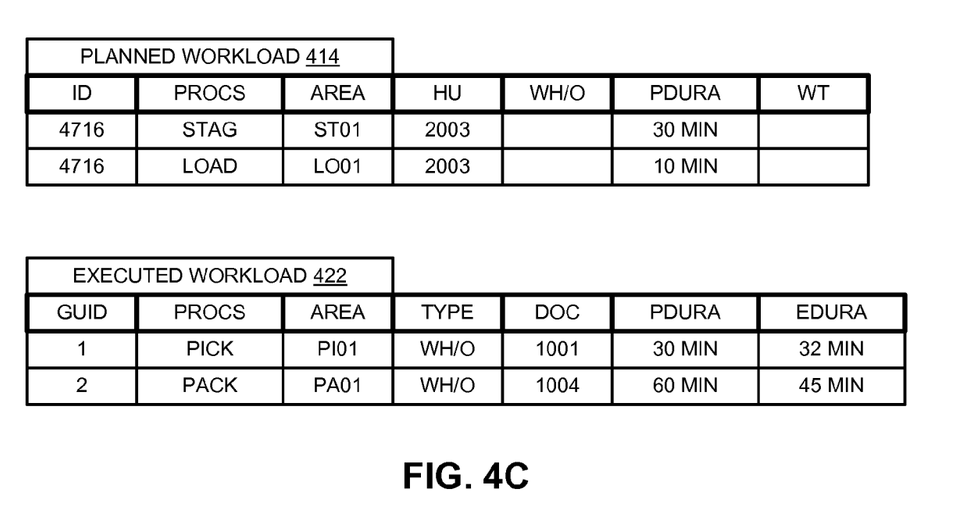

When the work associated with planned workload 412 is accomplished, the WTs of planned workload 410 can be confirmed. FIG. 4C illustrates that when the WTs are confirmed, the system can create WH/O 1004, which represents the aggregate of time (20+30+10=60 minutes total) for the three WTs (12345, 12346, and 12347, respectively) for the Packing phase. WH/O 1004 replaces the WTs within the system as identifying the Packing work executed. Thus, executed workload 422 illustrates the information of executed workload 420, and additionally includes GUID 2 to identify the Packing process for WH/O 1004, performed in area PA01. The planned duration was 60 minutes (PDURA), but the performer was able to accomplish the task in 45 minutes (EDURA). FIG. 4C also illustrates planned workload 414, which represents the task of packing HUs 2001 and 2002 into HU 2003. Thus, task ID 4716 is created for Staging HU 2003, with a planned duration of 30 minutes, and Loading HU 2003, with a planned duration of 10 minutes.

Figure 4D:
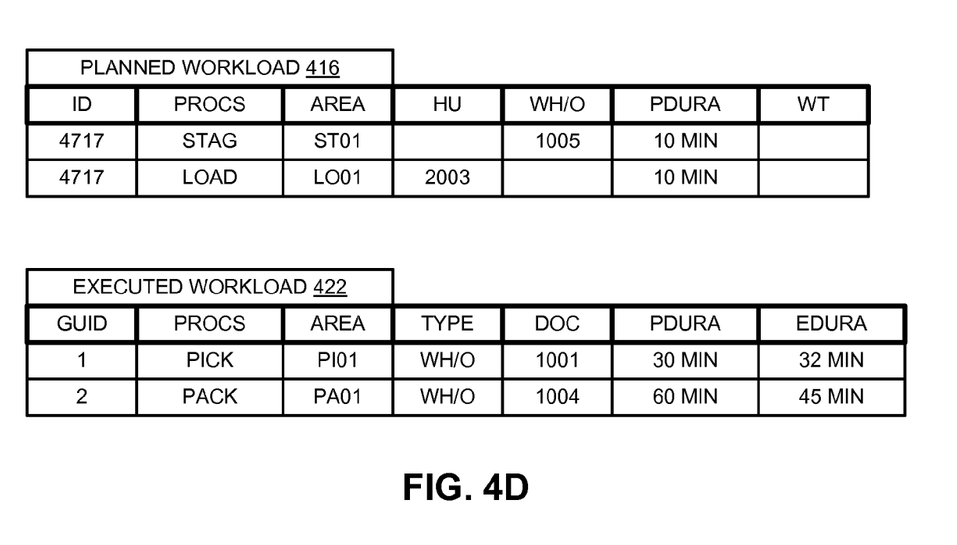

When HU 2003 is completed (i.e., HUs 2001 and 2002 are combined into HU 2003), the system creates WH/O 1005 for the move of HU 2003 from the Packing are to the Staging area. Note that the work associated with this phase will be accounted in other phases. As such, no recording documents are created, and the record of executed workload 422 is not updated with new data, as seen in FIG. 4D. Thus, there are situations where multiple planned workloads will be created and data created from those multiple planned workloads to input into an executed workload. As illustrated in FIG. 4D, planned workload 416 is generated to indicate WH/O 1005 to indicate the move of HU 2003 to Staging. The IDs of the tasks of planned workload 416 are 4717. Planned workload 416 also includes the Loading phase of HU 2003 at LO01. Both tasks of planned workload 416 are expected to take 10 minutes to complete.

Figure 4E:
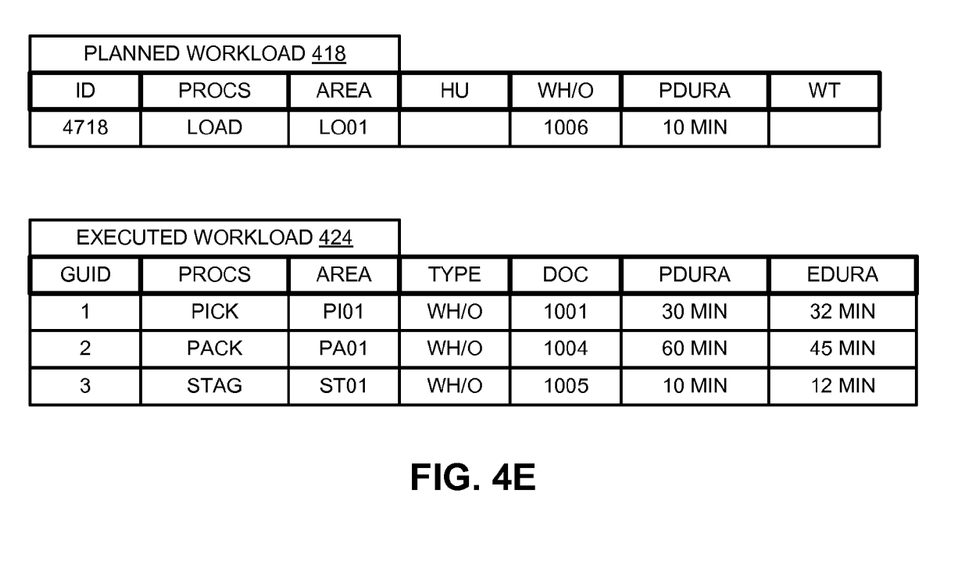

In FIG. 4E, WH/O 1005 is confirmed, and the data included within executed workload 424. WH/O 1006 is also created for the loading of HU 2003. The task for WH/O 1006 is 4718. In one embodiment, a warehouse may only have a single WH/O open for a single set of goods, and thus, WH/O 1006 was not created until WH/O 1005 had been confirmed. Other systems could function differently. Executed workload 424 is updated with GUID 3 indicating the completion of Staging at ST01 of WH/O 1005, with a planned duration of 10 minutes, and an actual duration of 12 minutes.

Figure 4F:
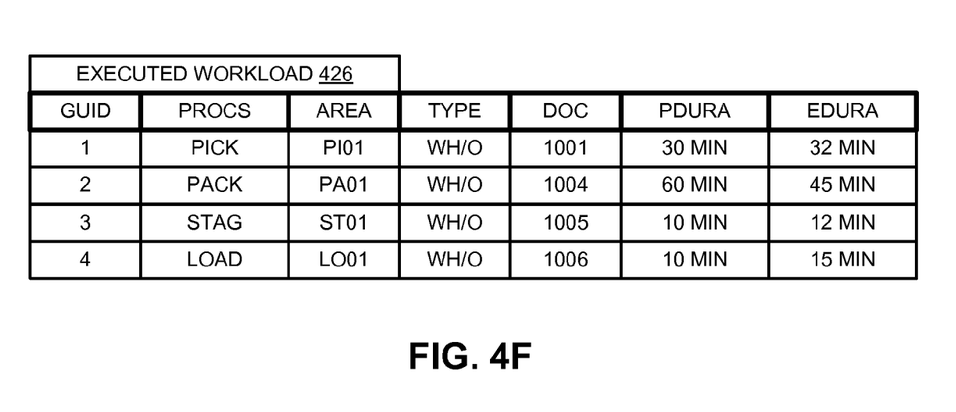

FIG. 4F illustrates executed workload 426, which is generated responsive to confirmation of WH/O 1006. GUID 4 identifies the Loading process associated with WH/O 1006 at station LO01, with a planned time of 10 minutes, and an actual time of 15 minutes. The final executed workload may be stored to reflect the work performed for the outbound delivery requested in the original warehouse order.

While a particular flow of operation is suggested by FIGS. 4A-4F, it will be understood that the concepts discussed herein can be applied in different implementations without necessarily following the suggested flow of operation of these figures.

Figure 5:
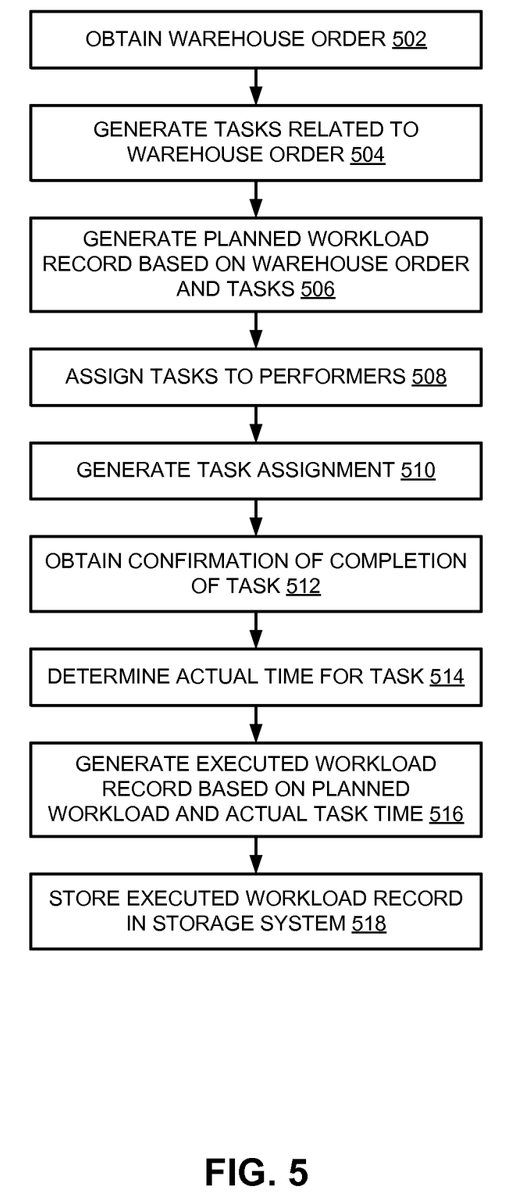
FIG. 5 is a flow diagram of an embodiment of a process for generating an executed workload.

FIG. 5 is a flow diagram of an embodiment of a process for generating an executed workload. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

A management system obtains a warehouse order, 502. The warehouse order can be generated within the management system, or can be generated in another enterprise system and retrieved by the management system, referenced in the management system, or sent to the management system. The management system generates one or more tasks related to the warehouse order, 504, such as separate tasks for different work assignment, or separate tasks for separate HUs. The management system generates a planned workload record based on the warehouse order and the tasks, 506. In one embodiment, a planned workload is generated and then assigned to a performer. Alternatively, the planned workload could be generated specifically for an identified performer. Multiple tasks could be generated for multiple performers related to the same warehouse order.

In one embodiment, a warehouse request is assigned to a wave. When the wave is released, warehouse tasks may be created. The warehouse tasks can then be sorted and filtered. A warehouse order creation rule is determined based on the sorting and filtering of the warehouse tasks. The warehouse order is created in accordance with the determined creation rule. The warehouse tasks are then assigned to the warehouse order.

The management system assigns the tasks related to the planned workload to one or more specific performers, 508. The system may generate task assignments for each of the assigned tasks, 510. When the performer has executed the work task, the performer indicates the completion of the task. The management system obtains confirmation of completion of a task, 512. In one embodiment, confirmation information is pushed to the management system. Alternatively, the completion information can be stored locally and delivered at specific intervals, or in response to a poll by the management system.

The management system determines the actual time for the task from the completion indication, 514. The completion indication may simply be a time value representing the amount of time spent to complete the task, or start and stop times. Comparison of the actual time to the planned time can indicate a performance of a performer. The system generates an executed workload record based on data in the planned workload and the actual task time, 516. The system stores the executed workload record in a storage system to persist the information, 518.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:
1. A method comprising:
receiving, from a warehouse management system, a planning electronic record at a warehouse station computing device of a warehouse identifying a task to be performed by a warehouse worker in the warehouse where goods are processed, the planning electronic record indicating at least one performance metric by which performance of the task is evaluated including an expected amount of time for completion, the electronic record further identifying a core business task to perform that is directly related to movement or processing of goods in the warehouse;
obtaining a confirmation of completion of the task at the warehouse station computing device;
determining an actual time for completion based on a time of the confirmation;
generating, by the warehouse station computing device, an executed work electronic record based on the planning electronic record, the executed work electronic record being a warehouse document distinct from the planning electronic record, which identifies the task and performer and indicates a task performance value for at least one of the performance metrics including the actual time for completion;

storing the executed work electronic record in storage system to enable tracking and evaluation of performance of the task via the warehouse management system;
retrieving multiple executed work electronic records stored in the storage system, each retrieved record related to an evaluation period; and
aggregating performance data from the multiple executed work electronic records into a single evaluation report.

2. The method of claim 1, further comprising:
receiving an additional electronic record identifying an indirect business task to perform, the indirect business task not being directly related to movement or processing of goods in the warehouse.

3. The method of claim 1, wherein receiving the planning electronic record comprises:
receiving a task assignment document generated in conjunction with a source document, the source document including data describing a resource related to the performance of the task.

4. The method of claim 3, further comprising:
linking the executed work electronic record to the source document.

5. The method of claim 1, further comprising:
obtaining information identifying a specific resource to be used in performance of the task;
adjusting the expected time for completion of the task based on a recalculation of an expected time for completion of the task using the specifically identified resource; and
storing the adjusted expected time in the executed work electronic document as the expected time for completion of the task.

6. The method of claim 5, further comprising:
comparing the actual time of completion with the adjusted expected time for completion to determine a variance between the expected time for completion of the task and the actual time of completion of the task.

7. The method of claim 1, wherein retrieving the multiple executed work electronic records related to an evaluation period comprises:
retrieving multiple executed work electronic records related to a single performer for the evaluation period.

8. The method of claim 7, wherein aggregating the performance data for the multiple executed work electronic records related to the single performer comprises:
aggregating the performance data according to an organizational unit identifier, a task type, and a task performance area.

9. The method of claim 1, wherein retrieving the multiple executed work electronic records related to an evaluation period comprises:
retrieving multiple executed work electronic records related to multiple different types of tasks for the evaluation period.

10. The method of claim 1, further comprising:
comparing the actual time of completion of tasks with the expected times for completion of the corresponding tasks as indicated by the executed work electronic records to generate an evaluation indicator; and
storing the evaluation indicator in the evaluation report.

11. The method of claim 1, further comprising:
comparing the actual attendance of a single performer with the expected time for completion of the corresponding tasks as indicated by the executed work electronic records to generate an evaluation indicator; and
storing the evaluation indicator in the evaluation report.

12. An article of manufacture comprising a non-transitory computer readable storage medium having content stored thereon to provide instructions to cause a machine to perform operations including:
receiving, from a warehouse management system, a planning electronic record at a warehouse station computing device of a warehouse identifying a task to be performed by a warehouse worker in the warehouse where goods are processed, the planning electronic record indicating at least one performance metric by which performance of the task is evaluated including an expected amount of time for completion, the electronic record further identifying a core business task to perform that is directly related to movement or processing of goods in the warehouse;
obtaining a confirmation of completion of the task at the warehouse station computing device;
determining an actual time for completion based on a time of the confirmation;
generating, by the warehouse station computing device, an executed work electronic record based on the planning electronic record, the executed work electronic record being a warehouse document distinct from the planning electronic record, which identifies the task and performer and indicates a task performance value for at least one of the performance metrics including the actual time for completion; and
storing the executed work electronic record in a storage system to enable tracking and evaluation of performance of the task via the warehouse management system
retrieving multiple executed work electronic records stored in the storage system, each retrieved record related to an evaluation period; and
aggregating performance data from the multiple executed work electronic records into a single evaluation report.

13. The article of manufacture of claim 12, further comprising content to provide instructions for receiving an additional electronic record identifying an indirect labor to perform, the indirect labor not being directly related to movement or processing of goods in the warehouse.

14. The article of manufacture of claim 12, further comprising content to provide instructions for
obtaining information identifying a specific resource to be used in performance of the task;
adjusting the expected time for completion of the task based on a recalculation of an expected time for completion of the task using the specifically identified resource; and
storing the adjusted expected time in the executed work electronic document as the expected time for completion of the task.

15. The article of manufacture of claim 12, further comprising content to provide instructions for
retrieving multiple executed work electronic records stored in the storage system, each retrieved record related to an evaluation period; and
aggregating performance data from the multiple executed work electronic records into a single evaluation report.

16. A system comprising:
a work execution station computing device of a warehouse at which a performer executes a task, and generates performance data related to performance of the task and a completion indicator to indicate completion of the task; and
a warehouse management system of the warehouse including a management server coupled to the work execution station, the warehouse management system to generate a planned workload identifying the task to be performed by a warehouse worker in the warehouse where goods are processed, the planning electronic record indicating at least one performance metric by which performance of the task is evaluated including an expected amount of time for completion of the task, the electronic record further identifying a core business task to perform that is directly related to movement or processing of goods in the warehouse; send the planned workload to the work execution station to trigger execution of the task; receive the performance data and completion indicator from the work execution station; determine an actual performance time for completion of the task; generate an executed workload with data of the planned workload and information to indicate the performer and a task performance value for at least one of the performance metrics including the actual performance time, the executed workload being a warehouse document distinct from the planned workload; ~t-store the executed workload in a storage system to enable tracking and evaluation of performance of the task via the warehouse management system: retrieve multiple executed work electronic records stored in the storage system, each retrieved record related to an evaluation period; and aggregate performance data from the multiple executed work electronic records into a single evaluation report.

17. The system of claim 16, wherein the work execution station generates performance data related to performance of the task, including performance values for one or more engineered labor standards.

18. The system of claim 16, wherein the warehouse management system further aggregates performance data from the multiple executed workloads into a single evaluation report for a period of evaluation.

* * * * *